United States Patent [19]

Chang et al.

[11] Patent Number: 4,594,333

[45] Date of Patent: Jun. 10, 1986

[54] ZEOLITE MODIFICATION

[75] Inventors: Clarence D. Chang, Princeton; Cynthia T. W. Chu, Pennington, both of N.J.

[73] Assignee: Mobil Oil Corporation, New York, N.Y.

[21] Appl. No.: 646,200

[22] Filed: Aug. 31, 1984

[51] Int. Cl.[4] .............................................. B01J 29/28
[52] U.S. Cl. ...................................... 502/71; 502/77; 502/85
[58] Field of Search .............................. 502/71, 77, 85

[56] References Cited

U.S. PATENT DOCUMENTS

| | | | |
|---|---|---|---|
| 4,435,516 | 3/1984 | Chang et al. | 502/71 |
| 4,443,554 | 4/1984 | Dessau | 502/71 |
| 4,468,475 | 8/1984 | Kuehl | 502/71 |
| 4,513,091 | 4/1985 | Chang et al. | 502/71 |

Primary Examiner—Carl F. Dees
Attorney, Agent, or Firm—Alexander J. McKillop; Michael G. Gilman; Dennis P. Santini

[57] ABSTRACT

The ion-exchange capacity and acid catalytic activity of a ZSM-5 type zeolite are increased by treatment of a physical mixture of the zeolite and a solid source of aluminum with water in the presence of an alkali metal compound activating agent and an alkali metal salt of a mineral acid.

18 Claims, 1 Drawing Figure

TOLUENE DISPROPORTIONATION-EXAMPLE 3

ZEOLITE MODIFICATION

FIELD OF THE INVENTION

This invention relates to a method for modifying the structure of crystalline zeolites and to the products thereby produced. It particularly relates to a modification whereby the acidic catalytic activity of the zeolite is increased. It more particularly relates to a method for increasing the acidic catalytic activity of ZSM-5 type zeolites and to the products formed by this method. It further relates to an improved catalytic process for the disproportionation of toluene.

BACKGROUND OF THE INVENTION

Zeolite catalysts have become widely used in the processing of petroleum and in the production of various petrochemicals. Acid catalyzed reactions such as cracking, hydrocracking, catalytic dewaxing, alkylation, dealkylation, transalkylation, isomerization, polymerization, addition, disproportionation, conversion of methanol to hydrocarbons, and other acid catalyzed reactions may be performed with the aid of these catalysts. Both natural and synthetic zeolites are known to be active for these reactions.

The common crystalline zeolite catalysts are the aluminosilicates such as Zeolites A, X, Y and mordenite. Structurally, each such material can be described as a robust three dimensional framework of $SiO_4$ and $AlO_4$ tetrahedra that are crosslinked by the sharing of oxygen atoms whereby the ratio of total aluminum and silicon atoms to oxygen is 1:2. These structures (as well as other crystalline zeolites of catalytic usefulness) are porous, and permit access of reactant molecules to the interior of the crystal through windows formed of eight-membered rings (small pore) or of twelve-membered rings (large pore). The electrovalence of the aluminum that is tetrahedrally contained in the robust framework is balanced by the inclusion of cations in the channels (pores) of the crystal.

An "oxide" empirical formula that has been used to describe the above class of crystalline zeolites is

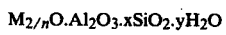
$$M_{2/n}O \cdot Al_2O_3 \cdot xSiO_2 \cdot yH_2O$$

wherein M is a cation with valence n, x has a value of from 2 to 10, and y has a value which depends on the pore volume of the particular crystal structure under discussion. The empirical oxide formula may be rewritten as a general "structural" formula

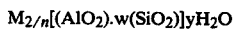
$$M_{2/n}[(AlO_2) \cdot w(SiO_2)]yH_2O$$

wherein M and y are defined as above, and wherein w has a value from 1 to 5. In this representation, the composition of the robust framework is contained *within* the square brackets, and the material (cations and water) contained in the channels is shown *outside* the square brackets. One skilled in the art will recognize that x in the empirical oxide formula represents the *mole ratio* of silica to alumina in the robust framework of a crystalline zeolite, and shall be referred to herein simply by the expression in common usage, i.e. "the silica to alumina ratio". (See "Zeolite Molecular Sieves", Donald W. Breck, Chapter One, John Wiley and Sons, New York, N.Y. 1974, which is incorporated herein by reference as background material).

With few exceptions, (such as with Zeolite A wherein x=2) there are fewer alumina tetrahedra than silica tetrahedra in the robust frameworks of the crystalline zeolites. Thus, in general, aluminum represents the *minor* tetrahedrally coordinated constituent of the robust frameworks of the common zeolites found in nature or prepared by the usual synthetic methods that employ only inorganic reagents.

For the above common zeolite compositions, wherein x has a value of 2 to 10, it is known that the ion exchange capacity measured in conventional fashion is directly proportional to the amount of the minor constituent in the robust framework, provided that the exchanging cations are not so large as to be excluded by the pores. If the zeolite is exchanged with ammonium ions and calcined to convert it to the hydrogen form, it acquires a large catalytic activity measured by the alpha activity test for cracking n-hexane, which test is more fully described below. And, the ammonium form itself desorbs ammonia at high temperature in a characteristic fashion.

It is generally recognized that the composition of the robust framework of the synthetic common zeolites, wherein x=2 to 10, may be varied within relatively narrow limits by changing the proportion of reactants, e.g., by changing the concentration of the silica relative to the alumina in the zeolite forming mixture. However, definite limits, for example in the maximum obtainable silica to alumina ratio, are observed. Synthetic faujasites having a silica to alumina ratio of about 5.2 to 5.6 can be obtained by changing said relative proportions. However, if the silica proportion is increased above the level which produces the 5.6 ratio, no commensurate increase in the silica to alumina ratio of the crystallized synthetic faujasite is observed. Thus, the silica to alumina ratio of about 5.6 must be considered an upper limit for synthetic faujasite in a preparative process using conventional reagents. Corresponding limits in the silica to alumina ratio of mordenite and erionite via the synthetic pathway are also observed.

A class of synthetic high silica content crystalline zeolites wherein x is at least 12, has recently been discovered. In general, such zeolites are made from a forming solution which contains an organic template. Unlike the common synthetic zeolites, these high-silica content zeolites appear to have no natural counterpart. Members of this new class of zeolites have many advantageous properties, which properties generally include a high degree of structural stability. They are used or have been proposed for use in various processes, especially catalytic processes. Known materials of this type include, for example, ZSM-beta (U.S. Pat. No. 3,308,069), ZSM-5 (U.S. Pat. No. 3,702,886), ZSM-11 (U.S. Pat. No. 3,709,979), and ZSM-12 (U.S. Pat. No. 3,832,449).

Unlike the common zeolites described above wherein x=2 to 5, the silica to alumina ratio for at least some of the high silica content zeolites is unbounded, i.e. the ratio may be infinitely large. ZSM-5 is one such example. U.S. Pat. No. Re. 29,948 to Dwyer et al. discloses a crystalline organosilicate essentially free of aluminum and exhibiting an X-ray diffraction pattern characteristic of ZSM-5 type aluminosilicates. Some other high silica content zeolites, however, appear to behave more like the commmon zeolites in that the upper limit of the compositional range of the crystals is fixed regardless of the silica content of the forming solution.

It is sometimes desirable to obtain a particular zeolite, for any of several reasons, with a higher or a lower silica to alumina ratio than is available by direct synthesis. With ion-exchange applications, for example and for catalytic reactions such as hydrocracking which require high acidity catalysts, low silica to alumina ratios are favorable. For structural stability to heat and steam, or high-temperature xylene isomerization, high silica to alumina ratios are required.

Commonly assigned U.S. patent application Ser. No. 573,776 filed by David Shihabi on Jan. 23, 1984 (U.S. Pat. No. 4,559,314) discloses and claims a method for producing an improved catalyst from a composite of a crystalline aluminosilicate zeolite having a silica to alumina ratio of at least 100 and a Constraint Index from 1 to 12 and an activating metal oxide comprising alumina by contacting the catalyst with water at 200° C. to 500° C. ZSM-5 is specifically recited. There appears to be no recognition therein of the advantageous effect of treatment with liquid water in the presence of an alkali metal compound.

Commonly assigned U.S. patent application Ser. No. 488,505 filed Apr. 25, 1983 (U.S. Pat. No. 4,478,950) describes and claims a method for enhancing the activity of a high silica content crystalline zeolite by contact with a solution containing organic cations and aluminum ions at a pH of at least 7 under autogenous pressure at 50° C. to 300° C. No requirement appears therein for an external solid source of aluminum.

Commonly assigned U.S. patent application, made by Clarence D. Chang and Joseph N. Miale, Ser. No. 631,687 filed July 16, 1984 (U.S. Pat. No. 4,559,315) describes and claims a method for increasing the acid catalytic activity of a ZSM-5 type zeolite by treatment with liquid water containing alkali metal cations. Commonly assigned U.S. patent application, made by Clarence D. Chang and Joseph N. Miale, Ser. No. 631,352 filed July 16, 1984 describes and claims a method for restoring catalytic activity to a specified heat-damaged catalyst by contact with a liquid aqueous medium. Neither U.S. Ser. No. 631,352 nor U.S. Pat. No. 4,559,315 teach incorporating an activation-promoting alkali metal salt of a mineral acid with the aqueous medium.

It is an object of this invention to provide a facile method for increasing the acid catalytic activity of a high silica content zeolite. It is a further object of this invention to increase the alumina content of the robust framework of a ZSM-5 type zeolite. It is a still further object of this invention to increase the ion exchange capacity of a zeolite. A still further object is to provide novel zeolite compositions. A still further object is to provide an improved process for hydrocarbon conversion. A still further object is to provide an improved process for the disproportionation of toluene. These and other objects will become evident on reading this entire disclosure and the appended claims.

BRIEF SUMMARY OF THE INVENTION

We have now found that the alumina content and the acid catalytic activity of a ZSM-5 type zeolite is increased when a physical mixture of the zeolite and a solid source of aluminum is contacted with an aqueous solution containing an activating amount of an alkali metal compound selected from the group consisting of an alkali metal hydroxide, an alkali metal salt of a weak acid having a dissociation constant less than about $10^{-4}$, and mixtures thereof, and an activation-promoting amount of an alkali metal salt of a strong mineral acid, under a combination of conditions including a temperature up to about 370° C. for less than about 1 hour to about 100 hours, said combination of conditions being effective to induce said increased activity, all as more fully described below. For purposes of the present invention, the presence of the alkali metal salt of a strong mineral acid serves to promote the activation effect of the remainder of the treating solution, providing higher levels of activation, and/or shorter treating time, and/or reduced treatment temperature than obtain in its absence. The mechanism of the promotion effect is not understood.

The modification of the zeolite is preferably induced by treatment with a continuous phase of liquid water having a pH of at least 7. The treatment advantageously is conducted in the absence of organic amines. Although the treatment may be conducted over the board temperature range of about 1° C. to 370° C., i.e. below the critical temperature of water, under the preferred conditions recited below an extensive increase in acid catalytic activity may be achieved at or below the normal boiling point of water, as more fully described hereinbelow.

We have also found that the treatment may be used to increase the acid catalytic activity of a virgin ZSM-5 type zeolite having a silica to alumina ratio of about 70:1 to as high as about 26000:1, as well as of ZSM-5 type catalysts which have become deactivated in use.

Another aspect of this invention provides an improved process for the disproportionation of toluene.

Another aspect of this invention provides an improved process for catalytically converting hydrocarbons.

DETAILED DESCRIPTION AND SPECIFIC EMBODIMENTS

Figure 1:
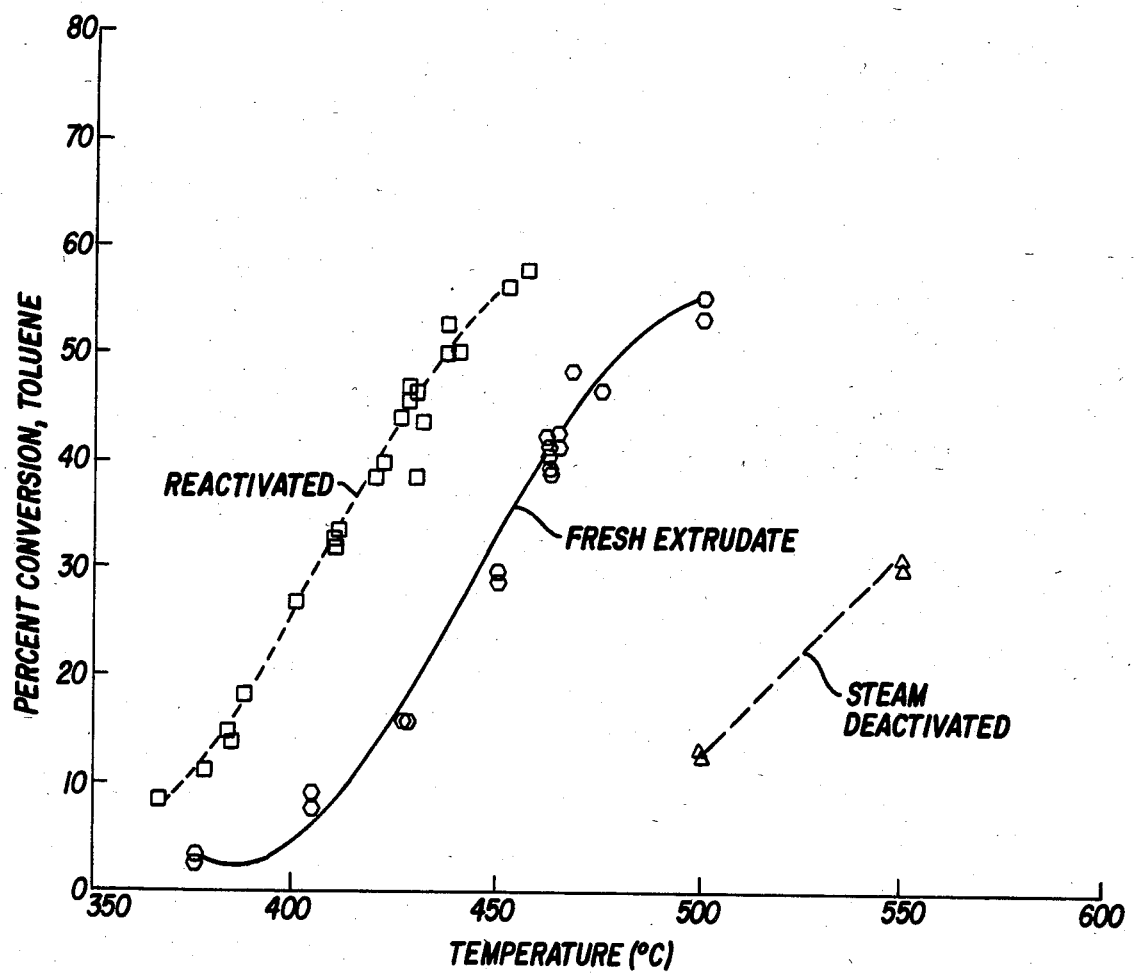
FIG. 1 of the drawing shows the effectiveness of a reactivated catalyst for toluene disproportionation.

The high silica content zeolite treated by the method of this invention is of the ZSM-5 type, exemplified by ZSM-5, ZSM-11, ZSM-12, ZSM-23, ZSM-35, ZSM-38 and ZSM-48, as more fully described hereinbelow. The treatment is conducted with a physical mixture of the zeolite and a solid source of aluminum. The solid source of aluminum, which is believed to furnish the aluminum for insertion into the robust framework of the zeolite, may be in the form of discrete beads of alumina, or it may be present as the alumina binder in an extrudate formed from a mixture of the zeolite and alpha alumina monohydrate, for example. Both of the foregoing variants exemplify physical mixtures for purposes of the present invention. The proportions of the zeolite and solid source of aluminum are not believed to be critical, and the physical mixture may contain 1 wt% to 99 wt%, preferably 15 wt% to 85 wt% of the solid source of aluminum. It has been observed that an intimate mixture, such as provided by an extrudate, activates more readily compared with a less intimate mixture such as that provided by discrete alumina beads, but both are effective. It is a feature of this invention that discrete alumina beads may be used to treat a zeolite either incorporated with or to be incorporated with an alumina-free binder.

Although the preferred solid source of aluminum is an alumina, one skilled in the art will recognize that other solids comprising alumina may be used. Such solids which may be used, either with or without prior treatment, include silica-alumina gels, clays such as attapulgite, montmorillonite, alumina hydrosols, and Dixie and Mac Namee clays.

For purposes of the method of this invention, the solid source of aluminum, such as an alumina, may be the sole source of aluminum.

The activation method of this invention is exceedingly simple. The physical mixture of ZSM-5 type zeolite and solid source of aluminum is treated with liquid water at a temperature below its critical temperature, i.e. below about 370° C. in the presence of an activating amount of an alkali metal compound and a promoter for a time effective to induce increased activity. The amount of liquid water required is at least that amount sufficient to fill the pores of the physical mixture to be treated. However, for maximum effectiveness, and for best repeatability and control of the activation process, it is preferred to use sufficient excess liquid water so that a portion or all of the physical mixture is submerged in liquid water, i.e. it is preferred to conduct the activation in a continuous phase of liquid water. Although the method of this invention may be practised over the whole range of temperature at which water remains liquid, i.e. from about 1° C. to 370° C., an outstanding feature is that activation is so facile that the normal boiling point of water often need not be exceeded. Very substantial activation may be observed at room temperature. A particularly preferred embodiment is to conduct the activation under reflux at about the normal boiling point of water, under which conditions the activity of a ZSM-5 sample, in as little as 2 hours, may be increased about 20-thousand fold from a hexane cracking activity of about 0.02 to 450.

As used herein, the term "alkali metal compound" means an alkali metal compound selected from the group consisting of an alkali metal hydroxide, an alkali metal salt of a weak acid having a dissociation constant less than about $10^{-3}$ (measured in water at a concentration of about 0.1N), and mixtures thereof. The term "promoter" refers to an alkali metal salt of a strong mineral acid which serves to promote acitvation by the alkali metal compound. The term "strong mineral acid" means an inorganic acid having no dissociation constant less than $10^{-2}$ (measured in water at 0.1N concentration). Nitric, hydrochloric and sulfuric acids are preferred mineral acids.

The above described treatment is conducted in the presence of an alkali metal compound such as a lithium, sodium or potassium compound added to the treatment water. The alkali metal compound may be furnished as the hydroxide, the alkali metal salt of a weak acid having a dissociation constant in water less than about $10^{-3}$, or as a mixture thereof, dissolved in the treatment water. Particularly preferred sources of alkali metal compound are sodium or potassium hydroxide, the sodium or potassium salts of acetic, carbonic and phosphoric acid, and mixtures thereof. The amount of alkali metal compound to be used may vary depending on the compound, but in all instances an activating amount is used, i.e. an amount effective in the absence of promoter to increase by a substantial amount, such as 20%, the acid catalytic activity over that observed by the same treatment conducted with the same physical mixture in the absence of said compound. The term "alkali metal" as used herein means a metal of the group consisting of lithium, sodium, potassium, rubidium and caesium.

The amount of promoter used also may vary, ranging from 0.1 mol to 20 mols of promoter per mol of alkali metal compound, and preferably from about 0.2 to 10 mols. In all cases, sufficient promoter is used to increase by at least 10% the acid catalytic activity over that observed with the alkali metal compound alone, i.e. in the absence of promoter, when evaluated under indentical conditions.

In the embodiment of the present invention practised with a continuous liquid water phase as described above, the liquid phase including dissolved source of alkali metal compound and promoter is adjusted if necessary to a pH of at least about 7, and preferably to a pH of about 7 to about 12. It has been observed that in treatment with alkali metal compound, optimal activation is fostered by an optimal concentration of hydroxyl ion. While this is not completely understood, it is believed that exposure of the physical mixture to excessive hydroxyl ion concentration under a given set of conditions leads to an excessive, counter-productive loss of crystallinity.

For the foregoing reasons, it is difficult to describe exactly what combinations of time and temperature conditions are most effective for activation of a specific zeolite with a specific amount or source of alkali metal compound and promoter. Nonetheless, with a given zeolite, it is a relatively simple matter to determine, with a few selected tests, an effective and even optimal operating range. Broadly, these will be within a temperature of 1° C. up to 370° C., for a time less than about 1 hour to 100 hours. A preferred temperature range is from about 10° C. to about 200° C., with about 20° C. to about 212° C. particularly preferred. For any of these temperature ranges, the preferred treatment time is from about less than 1 hour to 24 hours.

The treatment described in this invention most preferably is conducted in the absence of organic nitrogen compounds. It may be practised broadly with a ZSM-5 type zeolite having a silica to alumina ratio greater than about 12, and in particular with a silica to alumina ratio greater than about 60:1, greater than 500:1 and greater than 1600:1. Novel products of the ZSM-5 type may be produced therefrom having silica to alumina ratios of less than about 60:1.

DETAILED DESCRIPTION OF ZSM-5 TYPE ZEOLITES

The zeolite that is treated by the method of this invention is of the ZSM-5 type.

The ZSM-5 type zeolites are members of a novel class of zeolites that exhibit unusual properties. Although these zeolites have unusually low alumina contents, i.e. high silica to alumina ratios of at least 12, they are very active even when the silica to alumina ratio exceeds 30. The activity is surprising since catalytic activity is generally attributed to framework aluminum atoms and/or cations associated with these aluminum atoms. These zeolites have an intracrystalline sorption capacity for normal hexane which is greater than that for water, i.e. they exhibit "hydrophobic" properties.

An important characteristic of the crystal structure of this class of zeolites is that it provides constrained access to and egress from the intracrystalline free space by virtue of having an effective pore size intermediate between the small pore Linde A and the large pore Linde X, i.e. the pore windows of the structure have about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra.

The silica to alumina ratio referred to may be determined by conventional analysis. This ratio is meant to represent, as closely as possible, the ratio in the rigid anionic framework of the zeolite crystal and to exclude aluminum in the binder or in cationic or other form within the channels.

The ZSM-5 type zeolites referred to herein have an effective pore size such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of oxygen atoms, then access to molecules of larger cross-section than normal hexane is excluded and the zeolite is not of the ZSM-5 type. Windows of 10-membered rings are preferred, although in some instances excessive puckering of the rings or pore blockage may render these zeolites ineffective.

Rather than attempt to judge from crystal structure whether or not a zeolite possesses the necessary constrained access to molecules larger than normal paraffins, a simple determination of the "Constraint Index", or C.I., as herein defined may be made by passing continuously a mixture of an equal weight of normal hexane and 3-methylpentane over a small sample, approximately one gram or less, of zeolite at atmospheric pressure according to the following porcedure. A sample of the zeolite, in the form of pellets or extrudate, is crushed to a particle size about that of coarse sand and mounted in a glass tube. Prior to testing, the zeolite is treated with a stream of air at 1000° F. for at least 15 minutes. The zeolite is then flushed with helium and the temperature is adjusted between 550° F. and 950° F. to give an overall conversion between 10% and 60%. The mixture of hydrocarbons is passed at 1 liquid hourly space velocity (i.e. 1 volume of liquid hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The C.I. is calculated as follows:

$$C.I. = \frac{\log \text{(fraction of n-hexane remaining)}}{\log \text{(fraction of 3-methylpentane remaining)}}$$

The Constraint Index approximates the ratio of the cracking rate constants for the two hydrocarbons. Zeolites suitable for the present invention are those having a Constraint Index of 1 to 12. C.I. values for some typical zeolites are:

TABLE I

| CAS | C.I. |
| --- | --- |
| ZSM-4 | 0.5 |
| ZSM-5 | 8.3 |
| ZSM-11 | 8.7 |
| ZSM-12 | 2 |
| ZSM-23 | 9.1 |
| ZSM-35 | 4.5 |
| ZSM-38 | 2 |
| TMA Offretite | 3.7 |
| Beta | 0.6 |
| H—Zeolon (mordenite) | 0.4 |
| REY | 0.4 |
| Amorphous Silica-Alumina | 0.6 |
| Erionite | 38 |

The above-described Constraint Index is an important definition of those zeolites which are useful in the instant invention. The very nature of this parameter and the recited technique by which it is determined, however, admit of the possibility that a given zeolite can be tested under somewhat different conditions and thereby have different Constraint Indexes. Constraint Index seems to vary somewhat with severity of operation (conversion) and the presence or absence of binders. Therefore, it will be appreciated that it may be possible to so select test conditions to establish more than one value in the range of 1 to 12 for the Constraint Index of a particular zeolite. Such a zeolite exhibits the constrained access as herein defined and is to be regarded as having a Constraint Index of 1 to 12. Also contemplated herein as having a Constraint Index of 1 to 12 and therefore within the scope of the novel class of highly siliceous zeolites are those zeolites which, when tested under two or more sets of conditions within the above-specified ranges of temperature and conversion, produce a value of the Constraint Index slightly less than 1, e.g. 0.9, or somewhat greater than 12, e.g. 14 or 15, with at least one other value of 1 to 12. Thus, it should be understood that the Constraint Index value as used herein is an inclusive rather than an exclusive value. That is, a zeolite when tested by any combination of conditions within the testing definition set forth hereinabove and found to have a Constraint Index of 1 to 12 is intended to be included in the instant catalyst definition regardless that the same identical zeolite tested under other defined conditions may give a Constraint Index value outside of 1 to 12.

For ZSM-5 type zeolites of very high silica to alumina ratio, such as 1600:1, the Constraint Index cannot be measured reliably because of the low activity of the zeolite. In such cases reliance on X-ray pattern is useful. Many such zeolites, after activation by the method of this invention, become active enough to make Constrain Index evaluation feasible.

The class of zeolites defined herein is exemplified by ZSM-5, ZSM-11, ZSM-12, ZSM-21, ZSM-23, ZSM-35, ZSM-38, ZSM 48, and other similar materials. U.S. Pat. No. 3,702,886 describing and claiming ZSM-5 is incorporated herein by reference.

ZSM-11 is more particularly described in U.S. Pat. No. 3,709,979, the entire content of which is incorporated herein by reference.

ZSM-12 is more particularly described in U.S. Pat. No. 3,832,449, the entire content of which is incorporated herein by reference.

ZSM-21 is more particularly described in U.S. Pat. No. 4,046,859, the entire content of which is incorporated herein by reference.

ZSM-23 is more particularly described in U.S. Pat. No. 4,076,842, the entire content of which is incorporated herein by reference.

ZSM-35 is more particularly described in U.S. Pat. No. 4,016,245, the entire content of which is incorporated herein by reference.

ZSM-38 is more particularly described in U.S. Pat. No. 4,046,859, the entire content of which is incorporated herein by reference.

The specific zeolites described, when prepared in the presence of organic cations, are substantially catalytically inactive, possibly because the intra-crystalline free space is occupied by organic cations from the forming solution. These cations are removed by heating in an inert atmosphere at 1000° F. for one hour, for example, followed by base exchange with ammonium salts followed by calcination at 1000° F. in air.

The ZSM-5 type zeolites referred to herein have a crystal framework density, in the dry hydrogen form, of not less than about 1.6 grams per cubic centimeter. The dry density for known crystal structures may be calculated from the number of silicon plus aluminum atoms per 1000 cubic Angstroms, as given, e.g., on Page 19 of the article on Zeolite Structure by W. M. Meier. This paper, the entire contents of which are incorporated herein by reference, is included in "Proceedings of the Conference on Molecular Sieves, London, April 1967," published by the Society of Chemical Industry, London, 1968. When the crystal structure is unknown, the crystal framework density may be determined by classical pycnometer techniques. For example, it may be determined by immersing the dry hydrogen form of the zeolite in an organic solvent not sorbed by the crystal. Or, the crystal density may be determined by mercury porosimetry, since mercury will fill the interstices between crystal but will not penetrate the intracrystalline free space.

Crystal framework densities of some typical zeolites which may be restored by the method of this invention, including some which are not within the purview of this invention, are:

TABLE II

| Zeolite | Void Volume | Framework Density |
|---|---|---|
| Ferrierite | 0.28 cc/cc | 1.76 g/cc |
| Mordenite | .28 | 1.7 |
| ZSM-5, 11 | .29 | 1.79 |
| ZSM-12 | — | 1.8 |
| ZSM-23 | — | 2.0 |
| Dachiardite | .32 | 1.72 |
| L | .32 | 1.61 |
| Clinoptilolite | .34 | 1.71 |
| Laumontite | .34 | 1.77 |
| ZSM-4, Omega | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

The ZSM-5 zeolites that are treated by the method of this invention may be incorporated in another material usually referred to as a matrix or binder. Such matrix materials include synthetic or naturally occuring substances as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as alumina, silica-alumina and silica-magnesia. The matrix may be in the form of a cogel. The relative proportions of zeolite component and inorganic oxide gel matrix on an anhydrous basis may vary widely with the zeolite content ranging from between about 5 to about 99 percent by weight and more usually in the range of about 10 to about 80 percent by weight of the dry composite.

The term "acid catalytic activity" as used herein refers to the effectiveness of the zeolite, when in suitable form, for catalyzing reactions known to be promoted by so-called acid catalysts. Catalytic cracking, hydrocracking, skeletal isomerization, catalytic dewaxing, and various aromatic hydrocarbon reactions such as alkylation, dealkylation, isomerization and disproportionation, are hydrocarbon conversion reactions which fall in the category of acid catalyzed reactions. Other reactions, such as alcohol dehydration, are also in this class.

As is known in the art, the acid catalytic activity of a zeolite may be measured by its "alpha value", which is the ratio of the rate constant of a test sample for cracking normal hexane to the rate constant of a standard reference catalyst. Thus, an alpha value=1 means that the test sample and the reference standard have about the same activity. The alpha test is described in U.S. Pat. No. 3,354,078 and in *The Journal of Catalysis*, Vol. IV, pp. 522–529 (August 1965), both of which are incorporated herein by reference. Measurement of the "alpha value" is useful to assess the extent of catalyst activity before treatment, and also the degree of activation achieved with any sample treated by the method of this invention. For this purpose, the zeolite is converted to the hydrogen form before evaluation. However, other conversions also may be used to assess catalytic activity, as illustrated by Example 4 for toluene disproportionation.

The method of this invention is believed to effect insertion of aluminum into the robust framework of the zeolite, without substantial change of the crystal structure, i.e. a ZSM-5 type zeolite product is produced. The increased ion-exchange capacity of the product may be measured by ordinary ion-exchange techniques, or by temperature programmed desorption of ammonia. The ammonia desorption/TGA technique is described in a publication by G. T. Kerr in *Thermochemica Acta*, Vol. 3, p. 113, (1971), the contents of which are incorporated herein by reference.

The products produced by this invention are at least partially in the alkali metal form. They may be converted to the hydrogen or to any other form suitable for a particular application by methods known to those skilled in the art.

The crystalline materials prepared by the present method are useful as ion-exchangers and as catalyst components for a variety of conversion processes. Such processes include, as non-limiting examples, cracking hydrocarbons with reaction conditions including a temperature of from about 300° C. to about 700° C., a pressure of from about 0.1 atmosphere to about 30 atmospheres and a weight hourly space velocity of from about 0.1 to about 20; dehydrogenating hydrocarbon compounds with reaction conditions including a temperature of from about 300° C. to about 700° C., a pressure of from about 0.1 atmospher to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g. benzene, toluene and zylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g. methanol, or etheres, e.g. dimethylether, or mixtures thereof to hydrocarbons including aromatics with reaction conditions including a temperature of from about 275° C. to about 600° C., a pressure of from about 0.5 atmosphere to about 50 atmospheres and a liquid hourly space velocity of from about 0.5 to about 100; isomerizing xylene feedstock components with reaction conditions including a temperature of from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene with reaction conditions including a temperature of from about 200° C. to about 760° C., a pressure of from about atmospheric to about 60 atmospheres and a weight hourly space velocity of from about 0.08 to about 20; alkylating aromatic hydrocarbons, e.g. benzene and alkylbenzenes, in the presence of an alkylating agent, e.g. olefins, formaldehyde, alkyl halides and aclohols, with reaction conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmopsheres, a weight hourly space velocity of from about 10 to about 1000 and an aromatic hydrocarbon/polyalkylaromatic hydrocarbon mole ratio of from about 1/1 to about 16/1.

This invention will now be illustrated by example. However, the examples are not to be construed to limit the scope of the invention, which scope is defined by this entire specification and appended claims. All parts and proportions recited are by weight unless explicitely stated to be otherwise.

EXAMPLES

Example 1

An extrudate consisting of 65% high silica ZSM-5 ($SiO_2/Al_2O_3 = 26,000$) and 35% $Al_2O_3$ was refluxed for 20 hours with aqueous $Na_2CO_3$ (0.5M) and $NaNO_3$ (0.6M) solution. The extrudate was then washed, and converted into the ammonium form by exchange with 1N $NH_4NO_3$. The extrudate was then calcined at 538° C. and tested for n-hexane cracking activity. The starting material had alpha=1. The treated material has alpha=1451.

The ion exchange capacity of the ammonium form of the extrudate, both before and after treatment, was determined by the ammonia desorption/TGA (thermogravimetric analysis) technique. The results, computed on final weight (ash), were as follows:
before treatment: 0.08 meq/g
after treatment: 0.6077 meq/g.

Example 2

An extrudate consisting of 65% ZSM-5 ($SiO_2/Al_2O_3 = 70$) and 35% $Al_2O_3$ was steamed at 1000° F. for 16 hours. The steamed catalyst was refluxed for 20 hours with aqueous $Na_2CO_3$ (0.5M) and $NaNO_3$ (0.6M) solution. The extrudates were then washed, and converted into ammonium form by exchange with 1N $NH_4NO_3$. The extrudates were then calcined at 538° C. and tested for n-hexane cracking activity. The steam deactivated material had alpha=33. The treated material has alpha=1215.

Example 3

The activated catalyst of Example 2 was used to disproportionate toluene to benzene and xylenes by passing toluene vapor over the catalyst at various temperatures with pressure=150 psig, WHSV=4.7 and $H_2$/HC mole ratio=2.8. FIG. 1 shows the percent toluene conversion at various temperatures. Results are compared to the steamed deactivated ZSM-5 and conventional ZSM-5 ($SiO_2/Al_2O_3 = 70$). For 43% toluene conversion, the activated catalyst was run at 430° C., the conventional ZSM-5 at 475° C. The steamed deactivated catalyst ran at 550° C. shows only 30% conversion.

Example 4

A sample of the same batch of extrudate as was used in Example 1 was refluxed for 20 hours with aqueous $Na_2CO_3$ (0.5M) solution. The extrudate was then washed, and converted into the ammonium form by exchange with 1N $NH_4NO_3$. The extrudate was then calcined at 538° C. and tested for n-hexane cracking activity. The treated material was evaluated for hexane cracking activity and was found to have an alpha=1188.

Whereas this invention has been described with particular reference to an alkali metal compound as activator and, as promoter, an alkali metal salt of a strong mineral acid, it is contemplated that under certain conditions some or all of the alkali metal compound and/or some or all of the alkali metal salt of a strong mineral acid may be replaced with a corresponding alkaline earth metal compound. In particular, it is contemplated to substitute for the alkali element, either in part or in toto, the alkaline earth elements calcium, strontium or barium. These and other modifications of this invention may be made without departing from the spirit and scope thereof.

What is claimed is:

1. A method for modifying a composition to increase its acid catalytic activity, said composition comprising a physical mixture of a zeolite and a solid source of aluminum, said zeolite having a silica to alumina ratio of at least 12, and a Constraint Index of about 1 to 12, which method comprises:

contacting said mixture with an aqueous solution containing an activating amount of an alkali metal compound selected from the group consisting of an alkali metal hydroxide, an alkali metal salt of a weak acid having a dissociation constant less than about $10^{-3}$, and mixtures thereof, and an activation-promoting amount of an alkali metal salt of a strong mineral acid, under a combination of conditions including a temperature up to about 370° C. for less than about 1 hour to about 100 hours, said combination of conditions being effective to induce said increased activity.

2. The method described in claim 1 wherein said solid source of aluminum is present as discrete particles, liquid water is present as a continuous liquid phase, and said temperature is about 10° C. to 200° C.

3. The method described in claim 1 wherein said solid source of aluminum is present as binder for said zeolite.

4. The method described in claim 3 wherein said alkali metal is lithium, sodium or potassium, said weak acid is acetic, carbonic or phosphoric, said temperature is 10° C. to 200° C., and said aqueous solution is adjusted to a pH of 7 to about 12 before said contacting step.

5. The method described in claim 4 wherein said alkali metal compound is lithium, sodium or potassium hydroxide at a concentration of 0.001 to about 1 molar in said solution, said temperature is above 0° C. up to about 170° C., and said treatment time is less than about 1 hour up to about 24 hours.

6. The method described in claim 4 wherein said zeolite is ZSM-5 having a silica to alumina ratio of at least about 10.

7. The method described in claim 5 wherein said zeolite is ZSM-5 having a silica to alumina ratio of at least about 100.

8. The method described in claim 4 wherein said zeolite is ZSM-5 having a silica to alumina ratio of at least 70:1, and said combination of treatment conditions is effective to decrease said silica to alumina ratio to less than 60:1.

9. The method described in claim 5 wherein said zeolite is ZSM-5 having a silica to alumina ratio of at least 70:1, and said combination of treatment conditions is effective to decrease said silica to alumina ratio to less than 60:1.

10. The method described in claim 1 wherein said zeolite is ZSM-5.

11. The method described in claim 3 wherein said zeolite is ZSM-5.

12. The method described in claim 11 wherein said zeolite is deactivated ZSM-5.

13. A method for increasing the cation-exchange capacity of a zeolite having a silica to alumina ratio of at least 12, a Constraint Index of about 1 to 12, and a characteristic X-ray diffraction pattern, said method comprising:

forming a physical mixture of said zeolite with a solid comprising alumina, said mixture containing about 10 to 90 parts by weight of said zeolite;

contacting said mixture with an aqueous solution containing an activating amount of an alkali metal compound selected from the group consisting of an alkali metal hydroxide, an alkali metal salt of a weak acid having a dissociation constant less than about $10^{-3}$, and mixtures thereof, and an activation-promoting amount of an alkali metal salt of a strong mineral acid, under a combination of conditions including a temperature up to about 200° C. for less than about 1 hour to about 24 hours, said combination of conditions being effective to induce said increased cation-exchange capacity; and recovering a zeolite of increased cation-exchange capacity.

14. The method described in claim 13 wherein said alkali metal compound is sodium carbonate, said alkali metal salt is sodium nitrate, and said zeolite is ZSM-5.

15. The method described in claim 13 wherein said zeolite is ZSM-5.

16. The composition produced by the method of claim 13.

17. The composition produced by the method of claim 14.

18. The composition produced by the method of claim 1.

* * * * *

UNITED STATES PATENT AND TRADEMARK OFFICE
CERTIFICATE OF CORRECTION

PATENT NO. : 4,594,333

DATED : June 10, 1986

INVENTOR(S) : Clarence D. Chang and Cynthia T.W. Chu

It is certified that error appears in the above-identified patent and that said Letters Patent is hereby corrected as shown below:

Column 13, line 32, "10" should be -- 100 --.

Signed and Sealed this

Seventeenth Day of February, 1987

Attest:

DONALD J. QUIGG

Attesting Officer     Commissioner of Patents and Trademarks